US009188037B2

(12) United States Patent
Krauss et al.

(10) Patent No.: US 9,188,037 B2
(45) Date of Patent: Nov. 17, 2015

(54) EXHAUST GAS COOLER

(71) Applicants: HX Holding GmbH, Bochum (DE);
Caterpillar Motoren GmbH & Co. KG, Kiel (DE)

(72) Inventors: Dietmar Krauss, Huckeswagen (DE);
Jan Dreves, Kiel (DE); Michael Sturm, Gettorf (DE); Carsten Rickert, Kiel (DE); Udo Schlemmer-Kelling, Molfsee (DE)

(73) Assignees: HX HOLDING GMBH, Bochum (DE); CATERPILLAR MOTOREN GMBH & CO. KG, Kiel (DE)

( * ) Notice: Subject to any disclaimer, the term of this patent is extended or adjusted under 35 U.S.C. 154(b) by 0 days.

(21) Appl. No.: 14/377,917

(22) PCT Filed: Feb. 8, 2013

(86) PCT No.: PCT/EP2013/052554
§ 371 (c)(1),
(2) Date: Aug. 11, 2014

(87) PCT Pub. No.: WO2013/117703
PCT Pub. Date: Aug. 15, 2013

(65) Prior Publication Data
US 2015/0033710 A1 Feb. 5, 2015

(30) Foreign Application Priority Data

Feb. 10, 2012 (GB) .................................... 1202339.6
Aug. 10, 2012 (EP) .................................... 12180067

(51) Int. Cl.
*F02M 25/06* (2006.01)
*F01N 3/04* (2006.01)
(Continued)

(52) U.S. Cl.
CPC .............. *F01N 3/04* (2013.01); *F02M 25/0726* (2013.01); *F02M 25/0734* (2013.01);
(Continued)

(58) Field of Classification Search
CPC ...... F02M 25/0726; F28C 3/06; F23J 15/022; F28G 9/00; F01N 3/04
USPC ........................................................... 60/279
See application file for complete search history.

(56) References Cited

U.S. PATENT DOCUMENTS

2010/0024414 A1* 2/2010 Hittle et al. .................... 60/602
2011/0185714 A1* 8/2011 Lohbreyer et al. ............. 60/320

FOREIGN PATENT DOCUMENTS

DE 2725045 12/1978
EP 2270414 1/2011
(Continued)

OTHER PUBLICATIONS

English translation of Japanese Patent Application Publication No. JP 561122497A (Jun. 1986).*

*Primary Examiner* — Jason Shanske
(74) *Attorney, Agent, or Firm* — Occhiuti & Rohlicek LLP

(57) ABSTRACT

For exhaust gas recirculation in internal combustion engines operating, for example, with low sulphur marine diesel oil, an exhaust gas cooler with a cooling unit may be applied that uses a liquid injection system to maintain clean and/or clean a cooling surface of the cooling unit. The liquid injection system may provide liquid into an exhaust gas passage upstream of and or along a condensation starting region the cooling surface, thereby reducing the formation of films and deposits from particulate matter and condensing liquid of an evaporated liquid within the exhaust gas such as sulphuric acid and/or water, as those deposits could otherwise at least partially block the exhaust gas cooler.

15 Claims, 4 Drawing Sheets

(51) Int. Cl.
*F02M 25/07* (2006.01)
*F23J 15/02* (2006.01)
*F28G 9/00* (2006.01)
*F28F 19/00* (2006.01)
*F28D 21/00* (2006.01)
*F28C 3/06* (2006.01)

(52) U.S. Cl.
CPC ...... *F02M 25/0738* (2013.01); *F02M 25/0742* (2013.01); *F02M 25/0754* (2013.01); *F23J 15/022* (2013.01); *F28C 3/06* (2013.01); *F28D 21/0003* (2013.01); *F28F 19/00* (2013.01); *F28G 9/00* (2013.01); *F23J 2217/50* (2013.01); *F23J 2219/80* (2013.01); *Y02T 10/121* (2013.01); *Y02T 10/20* (2013.01)

(56) References Cited

FOREIGN PATENT DOCUMENTS

| | | |
|---|---|---|
| JP | 61-122497 | 6/1986 |
| WO | 98/27323 | 6/1998 |

\* cited by examiner

EXHAUST GAS COOLER

CROSS REFERENCE TO RELATED APPLICATIONS

This application is a National Stage of International Application No. PCT/EP2013/052554 filed on Feb. 8, 2013, which claims priority to Great Britain Application No. 1202339.6 filed on Feb. 10, 2012 and European Application No. 12180067.6 filed on Aug. 10, 2012, the contents of which are hereby incorporated by reference in their entireties.

TECHNICAL FIELD

The present disclosure generally refers to an exhaust gas cooler and more particularly to an exhaust gas cooler within an exhaust gas recirculation (EGR) line.

BACKGROUND

Due to a recently grown sense of responsibility for the environment and current and prospective emission regulations, it is an object of engine manufacturers to reduce the amount of air pollutants generated by internal combustion engines. Those air pollutants may include particulate matter (PM), nitrogen oxides ($NO_x$), and sulphur components.

Engine manufacturers have developed various approaches to reduce generation and exhaust of air pollutants. A well known technique to reduce generation of $NO_x$ is EGR. EGR may be performed by re-circulating a portion of the exhaust gas to the combustion process. Thereby, the temperature within the combustion chamber may be lowered and, thus, the generation of $NO_x$ may be reduced. To guide the exhaust gas to the charge air system, EGR lines may branch off at different positions in the exhaust gas system of an internal combustion engine.

For example, a so-called high pressure EGR may have its inlet arranged upstream of an exhaust gas turbine. The terminology "high pressure" is derived from the fact that the extracted exhaust gas has a pressure that is higher than the ambient pressure. The outlet of the EGR line may open into the charge air system of the internal combustion engine, for example, into the charge air manifold or upstream of the charge air manifold and downstream of a charge air cooler.

WO2011/066871 A1 discloses an exemplary embodiment of a high pressure EGR line. The EGR line is interconnected between an exhaust gas line and an air inlet. A high temperature (HT) cooler, an exhaust gas compressor, and a low temperature (LT) cooler are arranged within the EGR line. The extracted exhaust gas may subsequently be cooled in the HT cooler, pressurized in the exhaust gas compressor, and be further cooled in the LT cooler.

Cooling below or within the range of a dew point of an evaporated liquid within the extracted exhaust gas, for example, within a "high pressure" or a "low pressure" EGR line, may result in condensation of that liquid around condensation nuclei. Those condensation nuclei may be PM or a cooling surface of an exhaust gas cooler. As LT cooler typically include a condensation starting region where said dew point may be reached, that condensation starting region may be particularly affected. For example, formation of deposits containing PM and sulphuric acid may deposit on the cooling surface and may subsequently grow during operation. Those deposits (also referred to as fouling) may result in various negative effects on the EGR system and the engine such as an increased pressure drop across the LT cooler, a decreased cooling efficiency of the LT cooler, and/or a corroding cooling surface due to aggressive sulphuric acid.

The present disclosure is directed, at least in part, to improving or overcoming one or more aspects of prior systems.

SUMMARY OF THE DISCLOSURE

According to an aspect of the present disclosure, an exhaust gas cooler for cooling exhaust gas of an internal combustion engine may comprise a cooler housing. The cooler housing may have an exhaust gas inlet and an exhaust gas outlet forming an exhaust gas passage extending between the exhaust gas inlet and the exhaust gas outlet. The exhaust gas cooler may further comprise a cooling unit. The cooling unit may be installed in the exhaust gas passage and may comprise a cooling surface for cooling the exhaust gas. The cooling surface may comprise a condensation starting region where the exhaust gas may be cooled to a temperature within the range of a dew point of an evaporated liquid within the exhaust gas. Additionally, the exhaust gas cooler may comprise a liquid injection system that may comprise at least one liquid spray outlet that may be installed in the exhaust gas passage and may be configured such that during operation of the internal combustion engine at least some liquid sprayed from the at least one liquid spray outlet may be transported, for example in a liquid phase, to the condensation starting region.

According to another aspect of the present disclosure, a closed loop exhaust gas cooling system may comprise an exhaust gas cooler, at least one liquid collecting section, and a cleaner. The at least one collecting section may be positioned in a mounted orientation below a liquid injection system, a cooling unit, and/or an entrainment separator. The cleaner may be fluidly interconnected between the at least one collecting section and the liquid injection system.

According to another aspect of the present disclosure, an internal combustion engine may comprise a combustion unit with one or more cylinders and associated combustion chambers, and an exhaust gas recirculation system with an exhaust gas cooler and/or a closed loop exhaust gas cooling system.

According to another aspect of the present disclosure, a method for reducing clogging of a cooling unit of an exhaust gas cooler, the cooling unit having a cooling surface, may comprise, while cooling exhaust gas of an exhaust gas stream within the range of a dew point of an evaporated liquid within the exhaust gas such as sulphuric acid and/or water via the cooling surface, providing liquid into the exhaust gas stream such that the cooling surface may be maintained clean and/or cleaned by interaction of liquid with the cooling surface.

Other features and aspects of this disclosure will be apparent from the following description and the accompanying drawings.

DETAILED DESCRIPTION

Figure 1:
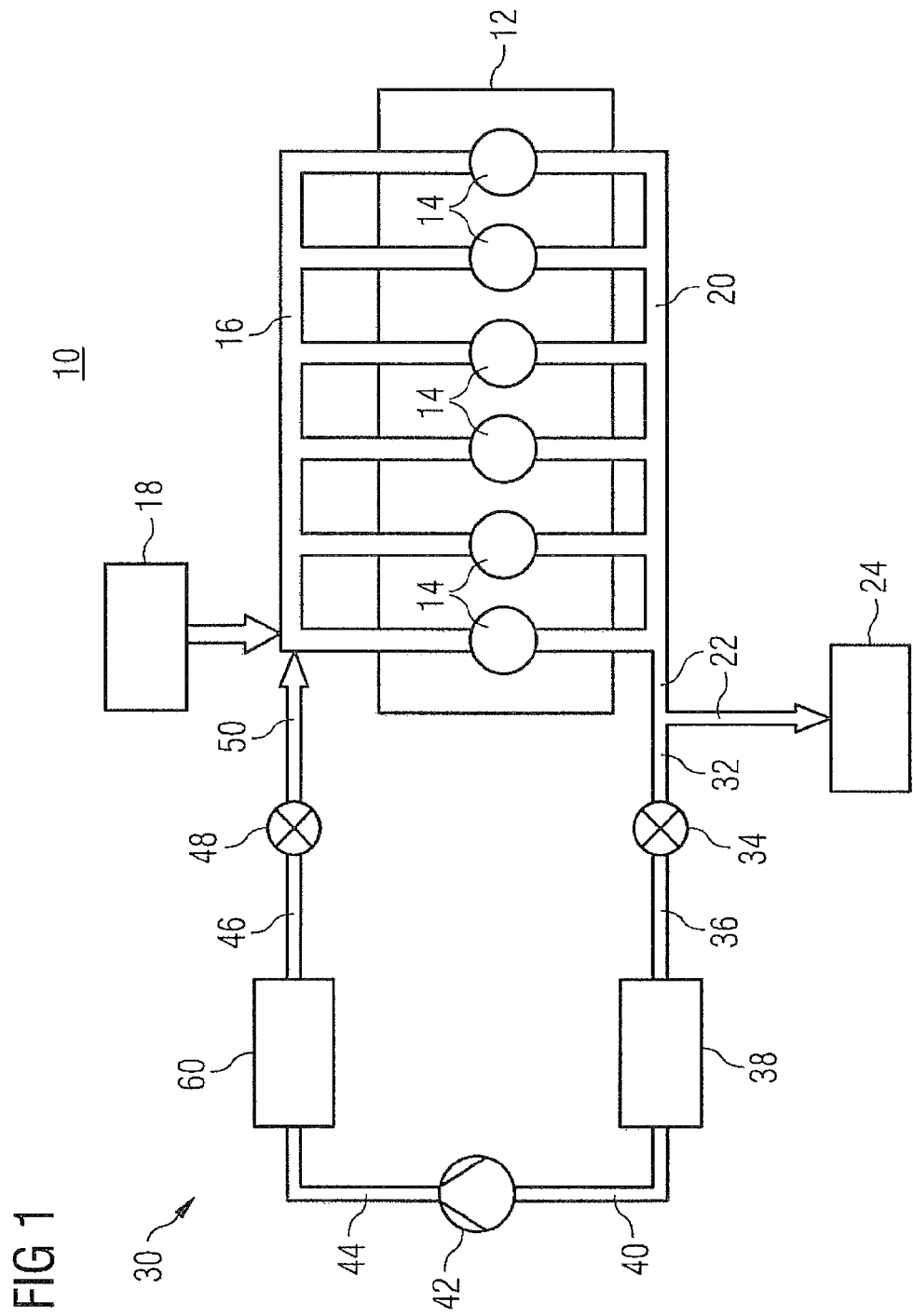
FIG. 1 shows a schematic diagram of an internal combustion engine with a combustion unit and an EGR line.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that, burning, for example, low sulphur marine diesel oil (LSMDO) with a fuel sulphur content of, for example, 1.000 ppm may affect EGR systems of internal combustion engines as the exhaust gas may contain sulphur components and PM.

For EGR, a certain amount of the exhaust gas may be branched off and re-circulated to the combustion unit. When cooling the extracted exhaust gas below a dew point of sulphuric acid, condensation may occur within the exhaust gas cooler, which—in combination with PM—may lead to, for example, clogging, blockage, and fouling of the exhaust gas cooler. As a result, an increased pressure drop may occur across the exhaust gas cooler. Additionally, the cooling efficiency of the exhaust gas cooler may be reduced and the condensed sulphuric acid may cause corrosion within the exhaust gas cooler, piping, and devices arranged downstream of the exhaust gas cooler. It is noted that condensation of an evaporated liquid on the cooling surface may increase a clogging tendency. For example, condensation of water in small amounts may also increase formation of deposits with PM. Exhaust from burning of other fuels such as alternative fuels (for example, pyrolysis based fuels) may contain other evaporated liquids that may lead to similar effects when condensing on a cooling surface.

Accordingly, an exhaust gas cooler is disclosed that may reliably reduce blockage and fouling due to self cleaning.

Additionally, condensed sulphuric acid and PM may be collected in a collecting section arranged below the exhaust gas cooler to reduce corrosive effects of the collected fluid onto piping and any devices arranged downstream of the exhaust gas cooler.

An exemplary embodiment of an EGR system of an internal combustion engine 10 is described in the following with reference to FIG. 1.

Internal combustion engine 10 may comprise a combustion unit 12 with one or more cylinders and associated combustion chambers 14. Internal combustion engine 10 may further comprise an air intake system 18, an exhaust gas line 22, and an exhaust gas system 24.

Combustion unit 12 may be, for example, a diesel, heavy fuel, and/or gas powered combustion unit. The cylinders may be arranged, for example, in an in-line, V, W, or any other known configuration.

Combustion unit 12 may further comprise an air inlet 16. Air inlet 16 may be configured as, for example, an intake manifold. Air intake system 18 may be connected to air intake 16 to provide compressed charge air to combustion chambers 14.

Combustion unit 12 may further comprise an exhaust gas outlet 20. Exhaust gas line 22 may be fluidly connected to exhaust gas outlet 20. Exhaust gas line 22 may guide exhaust gas from combustion chambers 14 to exhaust gas system 24.

Air intake system 18 and exhaust gas system 24 may be configured as a single-stage or two-stage turbo charged system.

Combustion unit 12 may further comprise an EGR system 30. EGR system 30 may comprise EGR lines 32, 36, 40, 44, 46, 50, an HT cooler 38, an exhaust gas compressor 42, an LT cooler 60, and valves 34, 48.

EGR line 32 may branch off from exhaust gas line 22. EGR line 32 may be fluidly connected to a valve 34. HT cooler 38 may be arranged downstream of and fluidly connected to valve 34 through EGR line 36. Exhaust gas compressor 42 may be arranged downstream of HT cooler 38. EGR line 40 may fluidly interconnect HT cooler 38 and exhaust gas compressor 42. EGR line 44 may be fluidly connected to exhaust gas compressor 42 with an inlet end. An outlet end of EGR line 44 may be fluidly connected to LT cooler 60.

LT cooler 60 may be, for example, an exhaust gas cooler as proposed by the present disclosure and described in greater detail hereinafter.

EGR line 46 may fluidly interconnect LT cooler 60 (exhaust gas cooler) and valve 48. EGR line 50 may fluidly connect valve 48 to air intake 16.

As shown, EGR line 50 may open into air intake 16. In some embodiments, EGR line 50 may open into air intake system 18. In case of a two-stage turbocharged system, EGR line 50 may open into a fluid connection of the two compressors of the two-stage turbocharged system.

Figure 2:
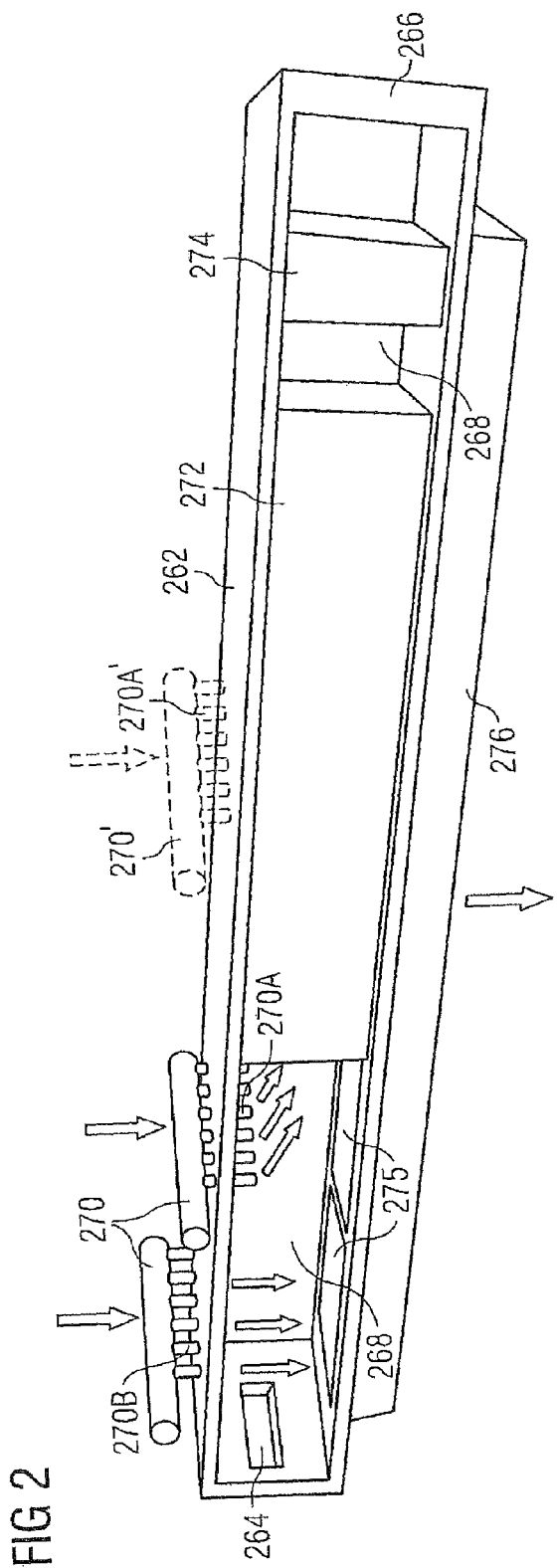
FIG. 2 shows a schematic drawing of an embodiment of an exhaust gas cooler.

Referring to FIG. 2, an exemplary embodiment of an exhaust gas cooler 260 is shown.

Exhaust gas cooler 260 may comprise a cooler housing 262 having an exhaust gas inlet 264 and an exhaust gas outlet 266. Cooler housing 262 may define an exhaust gas passage 268 between exhaust gas inlet 264 and exhaust gas outlet 266.

Cooler housing 262 may be made of a corrosion resistant material to withstand, for example, water, sulphuric acid, and/or other components within the exhaust gas. Cooler housing 262 may be configured to accommodate various components as is described hereinafter. Said components may be installed within cooler housing 262. It should be noted that other embodiments of cooler housing 262 may accommodate additional components associated with EGR recirculation and/or exhaust gas treatment.

Exhaust gas inlet 264 and exhaust gas outlet 266 may fluidly connect exhaust gas cooler 260 to EGR lines, for example, EGR lines 44 and 46 as shown in FIG. 1.

Exhaust gas cooler 260 may further comprise a liquid injection system 270 that may provide at least one liquid spray outlet 270A that is arranged within and/or open into exhaust gas passage 268.

Some embodiments may additionally comprise at least one other liquid spray outlet 270B as shown in FIG. 2 that is arranged within and/or open into exhaust gas passage 268.

Liquid injection system 270 may be fluidly connected to a liquid source (not shown) that may provide liquid to liquid injection system 270 as indicated by two arrows shown above liquid injection system 270 of FIG. 2.

Exhaust gas cooler 260 may further comprise a cooling unit 272. In the embodiment of FIG. 2, liquid injection system 270 may be arranged upstream of cooling unit 272. In some embodiments, at least one liquid spray outlet and of the liquid injection system may be alternatively or additionally arranged along a cooling unit in a condensation starting region and/or an initial cooling region as will be described in greater detail later on and as indicated by dotted liquid spray outlets 270A'.

In some embodiments, an exhaust gas cooler may comprise a liquid injection system that may only comprise at least one liquid spray outlet, or additionally comprise one or more sets of liquid spray outlets.

Liquid injection system 270 may comprise one tube or a plurality of fluidly connected tubes. Those tube or tubes may comprise one or more sets of liquid spray outlets, for example, at least one liquid spray outlet 270A and at least one other liquid spray outlet 270B. At least one other liquid spray outlet 270B may be configured to allow spraying and/or rinsing liquid into exhaust gas passage 268. For example, liquid spray outlets may be configured as nozzles such as spray nozzles or openings within a fluid guiding conduit. In the shown embodiment, liquid injection system 270 may comprise six liquid spray outlets 270A, and six liquid spray outlets 270B.

In some embodiments, at least one liquid spray outlet 270A may be configured such that liquid can be directed towards cooling unit 272. Thereby, it may be ensured that the liquid may flow with the exhaust stream and contact the surface of the cooling unit 272.

In some embodiments, at least one of the at least one liquid spray outlet 207A may spray liquid onto cooling surface 573.

Some embodiments may further comprise one or more valves arranged within the liquid injections system to allow or restrict the flow of liquid.

Cooling unit 272 may be, for example, a finned tube bundle, an unfinned tube bundle, a plate cooler, or other known types of cooling units used for exhaust gas cooling and/or gaseous media cooling. Specifically, cooling unit 272 may comprise cooled surfaces to interact with the passing exhaust gas.

In some embodiments, exhaust gas cooler 260 may further comprise an entrainment separator 274 as shown in FIG. 2. Entrainment separator 274 may be any type of separator that may be capable to considerably reduce an amount of entrainments such as water droplets, sulphuric acid droplets, and/or PM within passing exhaust gas. For example, entrainment separator 274 may be a cyclonic separator, a mesh-pad separator, a blade separator, a combination thereof, or any other known type of separator used for separating liquid and/or solid components from a gaseous medium. Entrainment separator 274 may be positioned between cooling unit 272 and exhaust gas outlet 266.

Other embodiments of an exhaust gas cooler may not comprise an entrainment separator. Instead, a separate entrainment separator may be positioned separately further downstream of an exhaust gas cooler, or an entrainment separator may not be necessary because a considerable amount of entrainments may have been already separated from the exhaust gas, for example, within a cooling unit arranged within an exhaust gas passage of an exhaust gas cooler.

Exhaust gas cooler may further comprise a collecting section 276 that may be positioned below liquid injection system 270, cooling unit 272, and/or entrainment separator 274. Collecting section 276 may be, for example, a trough, a basin, and/or a tube having at least one inlet, and may be made of, for example, a corrosion resistant material.

Exhaust gas passage 268 may comprise one or more openings 275 that may fluidly connect collecting section 276 with exhaust gas passage 268. Openings 275 may be positioned below and/or along liquid injection system 270 as shown in FIG. 2. Additional, for example slit like, openings may be positioned below cooling unit 272 and/or entrainment separator 274.

Collecting section 276 may further comprise a drain to drain off collected liquids and PM as indicated by the arrow shown in FIG. 2 below collecting section 276.

In some embodiments, a plurality of separate or connected collecting sections may be provided. For example, a first collecting section may be positioned below the liquid injection system, a second collecting section may be positioned below the cooling unit, and a third collecting section may be positioned below an entrainment separator. Of course, some embodiments of an exhaust gas cooler may only comprise one or two of the aforementioned first, second, and third collecting sections. Still further, additional collecting sections may be positioned at other suitable positions, for example, within or downstream of an exhaust gas cooler.

Figure 3:
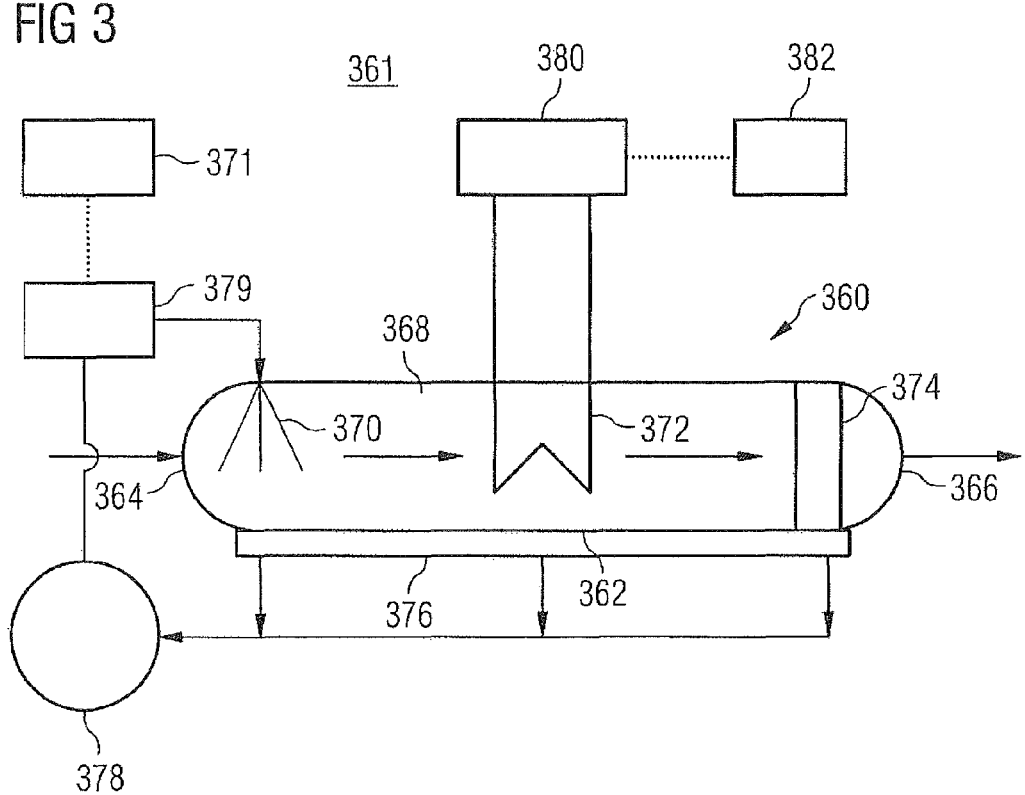
FIG. 3 shows a schematic diagram of a closed loop exhaust gas cooling system.

As shown in FIG. 3, an exemplary embodiment of a closed loop exhaust gas cooling system 361 may comprise an exhaust gas cooler 360, a cleaner 378, and a cooling circuit 380.

Exhaust gas cooler 360 may be configured as explained with respect to exhaust gas cooler 260 shown in FIG. 2. For ease of comparison, similar components will be referred to with similar reference numerals in the "300" series. It should be noted that other embodiments of a closed loop exhaust gas cooling system may comprise other embodiments of an exhaust gas cooler such as described in connection with FIG. 2.

Referring to FIG. 3, cleaner 378 may be fluidly connected to collecting section 376, or in some embodiments to more than one collecting section. Specifically, cleaner 378 may be fluidly interconnected between collecting section 376 and liquid injection system 370 of exhaust gas cooler 360. A liquid pump 379 may be fluidly connected upstream or downstream of cleaner 378. Liquid pump 379 may be connected to liquid injection control unit 371.

Cleaner 378 may be any kind of cleaner configured to separate PM, sulphuric acid, and/or other components from originally provided liquid sprayed or rinsed into exhaust gas passage 368 by liquid injection system 370. For example, cleaner 378 may comprise one or more components for physical, chemical, and/or biological purification of a liquid. For example, cleaner 378 may comprise a sedimentation basin, any type of filter, and/or a deacidification unit.

In some embodiments, cooling unit 372 of exhaust gas cooler 360 may be fluidly connected to cooling circuit 380. Cooling circuit 380 may be controlled by a cooling circuit control unit 382.

In some embodiments, cooling circuit 380 may further comprise one or more cooling units of a charge air system, an EGR system, an exhaust gas aftertreatment system, and/or an internal combustion engine in general.

In some embodiments, cooling circuit control unit 382 may be provided together with liquid injection control unit 371 in a common control unit. In some embodiments, the common control unit may be a section of an EGR control unit and/or an engine control unit.

Figure 4:
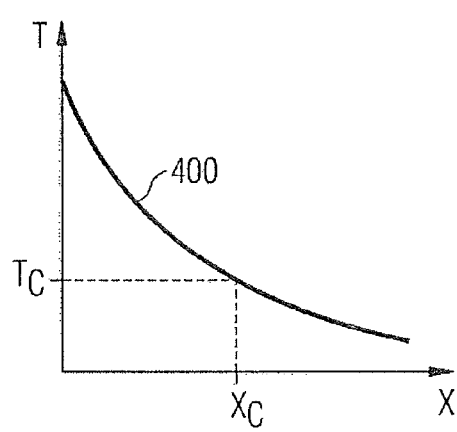
FIG. 4 shows a diagram including a graph indicating a temperature of exhaust gas passing the cooling units of FIGS. 5 and 6, respectively.
Figure 5:
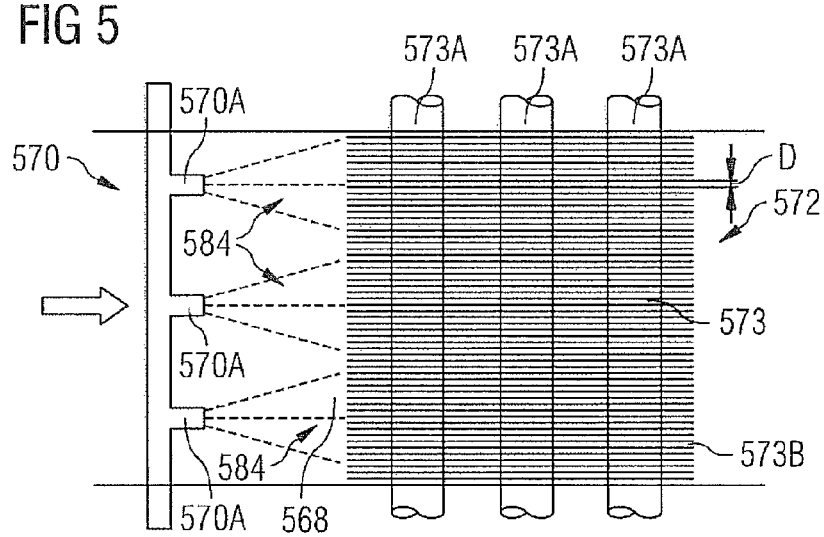
FIG. 5 shows a schematic drawing of a liquid injection system and a cooling unit installed in an exhaust gas passage.
Figure 6:
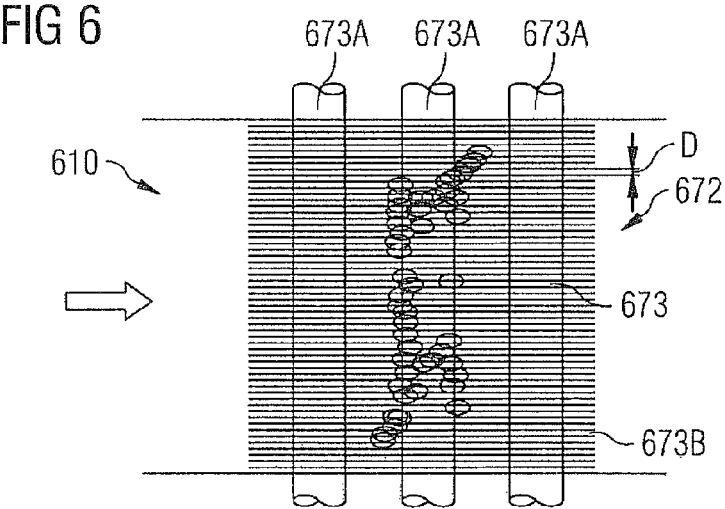
FIG. 6 shows a schematic drawing of a cooling unit installed in an exhaust gas passage.

Hereinafter FIGS. 4-6 are described in short to reference on them later on when describing operation and functionality of the exhaust gas cooler and, in particular, to depict differences to conventional exhaust gas coolers.

FIG. 4 shows a temperature-distance-diagram. In the temperature-distance-diagram, line 400 indicates a temperature of the exhaust gas when passing along the cooling unit. The temperature $T_c$ at a distance $X_c$ indicates the critical temperature at which due to, for example, a chemical and/or physical reaction within the exhaust gas deposits may form at the surface of the cooling unit. In FIG. 5 and FIG. 6, the direction of passing exhaust gas is indicated with an arrow.

FIG. 5 shows a schematic view of an exhaust gas passage 568 along an injection system 570 and a cooling unit 572. To ease comparison, similar components to those already described with reference to FIGS. 2 and 3 will be referred to with similar reference numerals in the "500" series.

In contrast, FIG. 6 shows a schematical view of an exemplary exhaust gas passage 610 within a conventional exhaust gas cooler having a conventional cooling unit 600. It is noted that the conventional cooler of FIG. 6 does not comprise an injection system as discussed above in connection with FIGS. 2 and 3.

As discussed above, cooling units 572 and 600 of FIGS. 5 and 6, respectively, may be configured as a finned tube bundle and may comprise, for example, three cooling tubes and 573A and 673A and a plurality of associated cooling fins 573B and 673B providing a large cooling surface 573 and 673 that may be cooled down with cooling tubes 573A and 673A, respectively. It should be noted that a quantity of cooling tubes 573A and 673A and cooling fins 573B and 673B may be adapted and may be chosen depending on different aspects such as desired cooling efficiency, pressure range, and temperature range.

Each cooling fin 573B and 673B may be spaced from an opposed cooling fin in a distance D. Distance D may be within a range of, for example, 0.1 mm to 10 mm.

As described before, other embodiments may comprise a cooling unit that may be configured as an unfinned tube bundle, plate cooler, or other known types of cooling units used for exhaust gas cooling and/or gaseous media cooling. In the case of a finned tube bundle or an unfinned tube bundle, exhaust gas may either flow through the cooling tubes or around the cooling tubes.

INDUSTRIAL APPLICABILITY

In the following the basic operation of the above exemplary embodiment of an exhaust gas cooler will be described with reference to FIGS. 1 to 6.

During normal operation of internal combustion engine 10, fuel and charge air may be supplied to and burned in combustion unit 12. Exhaust gas may leave combustion unit 12 through exhaust gas outlet 20 to exhaust gas line 22. A portion of the exhaust gas may be branched off from exhaust gas line 22 to EGR line 32.

Exhaust gas in EGR line 22 may subsequently pass HT cooler 38 and exhaust gas compressor 42. Afterwards, exhaust gas may enter LT cooler 60 that may be configured as exhaust gas cooler 260.

As can be seen in FIG. 2, cooling unit 272 of exhaust gas cooler 260 may cool exhaust gas via a cooling surface 573 (see FIG. 5) to a temperature within a range of or below a dew point Tc of an evaporated liquid within the exhaust gas. The evaporated liquid may be, for example, sulphuric acid and/or water.

Typically, in a conventional system of an LT EGR cooler, three regions may be differentiated with respect to temperature levels, clogging, and fouling. Exhaust gas may be cooled in an initial cooling region to a temperature above a dew point of an evaporated liquid, in a condensation starting region to a temperature within a dew point of an evaporated liquid, and in an end cooling region to a temperature below a dew point of a water. The initial cooling region may merge into the condensation starting region, and the condensation starting region may merge into an end cooling region.

The exhaust gas enters the cooling unit 672 in the initial cooling region of the cooling surface 673. The initial cooling region may be characterised by cooling the exhaust to a temperature that may be above a dew point of any evaporated liquid within the exhaust gas. PM within the exhaust gas may form a dry and thin film on the cooling surface 673 in the initial cooling region. It is noted that substantially no evaporated liquid within the exhaust gas may condense within the initial cooling region. The thin and dry film in the initial cooling region may slightly decrease the cooling efficiency of the cooling unit.

The exhaust gas may be further cooled in the condensation starting region of the cooling surface 673 (herein referred to as condensation starting region) that may be characterised by cooling the exhaust gas to a temperature within the range of a dew point Tc of an evaporated liquid within the exhaust gas. The evaporated liquid may be, for example, water or sulphuric acid.

As the dew point of the evaporated liquid is reached, the evaporated liquid may condense around condensation nuclei such as PM and cooling surface 673. Initially, the condensed liquid may form together with PM a viscous and sticky film in the condensation starting region of cooling surface 673. This viscous and sticky film may further attract PM and condensing liquid. Deposits may form in the condensation starting region that may subsequently grow during operation. Larger deposits of condensed liquid and PM may form and may partly block exhaust gas passage 610 and, thus, may increase a pressure drop across cooling unit, may reduce cooling efficiency of cooling unit 672, and may further lead to corrosion of cooling surface 673.

An arrangement of cooling fins 673B of cooling surface 673 in a distance D of, for example, several tens of millimeters may further facilitate the growth of deposits. Referring to FIG. 4, a modified line indicating a temperature of exhaust gas when passing a partially clogged cooling unit may have a decreased negative gradient compared to line 400 at similar positions X.

In the end cooling region of the cooling surface 673, the exhaust gas may be cooled to a temperature considerably below a dew point of water. Evaporated water within the exhaust gas may condense in a considerable amount in the end cooling region. The considerable amount of condensed water may reduce the formation of deposits within the end cooling region of the cooling surface 673.

It is noted that a cooling surface may not comprise an initial cooling region as exhaust gas may be already at a temperature within the range of a dew point of an evaporated liquid within the exhaust gas when entering the cooling unit.

It is further noted that a cooling surface may not comprise an end cooling region as exhaust gas may be only cooled to a temperature within the range of a dew point of an evaporated liquid within the exhaust gas in the cooling unit.

In the case of burning LSMDO with a fuel sulphur content of 1000 ppm, the exhaust gas may contain sulphuric components. Sulphuric acid may condense in the condensation starting region and may form the described deposits together with PM. In the end cooling region, evaporated water within the exhaust gas may condense in a considerable amount. The considerable amount of condensed water may reduce the formation of deposits within the end cooling region of the cooling surface.

It is noted that other fuels having substantially no sulphur content may also form deposits in the condensation starting region of the cooling surface. For example, exhaust gas may be cooled to a temperature within the range of a dew point of water in the condensation starting region of the cooling surface. Small amounts of water may condense and may form deposits together with PM. In the end cooling region of the cooling surface, in which the exhaust gas may be cooled to a temperature considerably below a dew point of water, the amount of condensed water may be sufficient to reduce the formation of deposits.

It is noted that the above described effects may occur in a cooling unit if exhaust gas may be cooled to a temperature within the range of a dew point of an evaporated liquid within the exhaust gas.

It is further noted that a dew point of an evaporated liquid within the exhaust gas is dependent on many factors such as pressure level, fuel air ratio, fuel composition, for example, fuel sulphur content. For example, a dew point for sulphuric acid may be around 140° C. at an absolute pressure of 6 bar, an air-fuel ratio of 1.8, a fuel sulphur content of 1000 ppm, and a transformation degree from $SO_2$ to $SO_3$ of 5%. In general, a range of a dew point for sulphuric acid may be 100° C. to 140° C.

A liquid injection system installed in an exhaust gas passage may reduce the above-mentioned effects including the growth of deposits on the cooling surfaces.

As can be seen in FIG. 2, liquid injection system 270 of exhaust gas cooler 260 may provide a liquid such as water into exhaust gas passage 268. Exhaust gas may pass exhaust gas passage 268 from exhaust gas inlet 264 to exhaust gas outlet 266. Thereby, exhaust gas may be mixed with liquid from liquid injection system 270 within exhaust gas passage 268 and pass as a mix cooling unit 272.

At least one liquid spray outlet 270A may spray liquid into the exhaust gas that may be transported to cooling unit 272. The provided liquid may interact with the cooling surface 573 of the cooling unit and, thereby, may maintain clean and/or clean the cooling surface 573. In particular, liquid may be transported in liquid phase to, for example, the condensation starting region of cooling unit 272, where the exhaust gas may be cooled to a temperature around a dew point of an evaporated liquid within the exhaust gas. That condensation starting region may be best seen in FIGS. 4 to 6 and may be within the range of position Xc at temperature Tc.

Specifically as illustrated in FIG. 5, liquid sprayed by at least one liquid spray outlet 570A may considerably reduce formation of a film in a initial cooling region and deposits in a condensation starting region as described for conventional systems with respect to FIG. 6. Specifically, at least some of the provided liquid may impinge on cooling surface (573) in a liquid phase, for example, on the initial cooling region, the condensation starting region, and/or the end cooling region, and may loosen, dissolve and/or incorporate particles of film and deposits. The liquid may transport those particles of condensed liquid from the exhaust gas and PM away from cooling surface 573 through openings 275 into at least one collecting section 276 as can be best seen in FIG. 2. Thereby, the provided liquid may maintain clean and/or may clean cooling surface 573 as the provided liquid may be transported by the exhaust gas passing along exhaust gas passage 568.

As an example, water may be provided as liquid by liquid injection system 570. The provided water may be sprayed and may form water droplets 584.

In some embodiments, a liquid injection control unit 371 may adjust operation of liquid injection system 370 and/or an associated liquid pump 379. For example, a liquid injection control unit 371 may be configured to adjust the operation of the liquid injection system 370 in a continuous and/or non-continuous (for example, pulsed) operation mode. In addition or alternatively, liquid injection control 371 unit may be configured to adjust the operation of the liquid injection system 370 in dependence of one or more control parameters such as the type of fuel, the sulphur content of the fuel, the air-fuel ratio, a time interval, a volume flow through the exhaust gas cooler, a pressure drop along the exhaust gas cooler, a pressure upstream of the exhaust gas cooler, and a pressure downstream of the exhaust gas cooler. Accordingly, respective sensors may be provided in the exhaust gas cooler or within neighbouring components of an EGR line. In some embodiments, the liquid injection control unit may be a section of an EGR control unit and/or an engine control unit and/or cooling circuit control unit 382.

In some embodiments, at least one liquid spray outlet 270A' may be positioned along cooling unit 272 as shown in FIG. 2. In some embodiments, those liquid spray outlets 270A' may be positioned near a condensation starting region where the exhaust gas is cooled to a temperature within the range of a dew point of an evaporated liquid within the exhaust gas such as sulphuric acid. This condensation starting region may be best seen in FIGS. 5 to 6 and may be within the range of position Xc at temperature Tc. In addition and as shown in FIG. 2, at least one other liquid spray outlet 270B may further provide liquid into exhaust gas passage 268. Specifically, PM may be washed out from the exhaust gas by the liquid provided by at least one other liquid spray outlet 270B.

In general, provided liquid of at least one liquid spray outlet 270A and at least one other liquid spray outlet 270B may reduce the amount of PM within the exhaust gas passing along exhaust gas cooler 360.

Collecting section 276 may collect liquid provided from liquid injection system 270, condensed liquid of the exhaust gas, and PM within the liquid.

Referring to FIG. 3, collected liquid and PM within at least one collecting section 376 may be directed to cleaner 378 to clean the liquid from PM, sulphuric acid and further components. Cleaner 378 may provide cleaned liquid to liquid injection system 370 via a liquid pump 379 for re-use. Liquid injection control unit 371 may control liquid pump 379 to adjust a flow of liquid to liquid injection system 370.

Cooling unit 372 may be connected to a cooling circuit 380. Cooling circuit 380 may provide coolant to cooling unit 372. Cooling circuit control unit 382 may be configured to set a coolant temperature and/or a coolant flow rate of a coolant provided to cooling unit 372 such that exhaust gas passing cooling unit 372 may be cooled to a desired temperature. This temperature may be below a dew point of an evaporated liquid within the exhaust gas and may be at least 140° C., 100° C., 80° C., 50° C., 45° C., 40° C., or 35° C. In some embodiments, the cooling circuit control unit may be a section of an EGR control unit and/or an engine control unit and/or liquid injection control unit 371.

Entrainment separator 374 may be installed in exhaust gas passage 362. Entrainment separator 374 may remove left entrainments in the exhaust gas passing exhaust gas cooler 360 before directing exhaust gas to an air intake 16 of an internal combustion engine 10 (see FIG. 1).

In some embodiments, exhaust gas leaving exhaust gas cooler 360 may have a temperature similar to charge air temperature in air intake 16, for example, 45° C.

It is noted that the described exhaust gas cooler may be used for EGR, aftertreatment, and/or other applications that may comprise an exhaust gas cooler that may cool exhaust gas to a temperature within a dew point of an evaporated liquid within the exhaust gas.

Although the preferred embodiments of this invention have been described herein, improvements and modifications may be incorporated without departing from the scope of the following claims.

LIST OF ELEMENTS

10 Internal combustion engine
12 Combustion unit
14 Combustion chamber
16 Air intake
18 Air intake system
20 Exhaust gas outlet
22 Exhaust gas line
24 Exhaust gas system
30 EGR system
32 EGR line
34 Valve
36 EGR line
38 HT cooler
40 EGR line
42 Exhaust gas compressor
44 LT cooler/exhaust gas cooler
260 Exhaust gas cooler
262 Cooler housing
264 Exhaust gas inlet
266 Exhaust gas outlet
268 Exhaust gas passage
270 Liquid injection system
270' Liquid injection system
270A Liquid spray outlet
270A' Liquid spray outlet
270B Liquid spray outlet
272 Cooling unit
274 Entrainment separator
275 Opening
276 Collecting section
360 Exhaust gas cooler
361 Closed loop exhaust gas system
362 Cooler housing
364 Exhaust gas inlet
366 Exhaust gas outlet
368 Exhaust gas passage
370 Liquid injection system
371 Liquid injection control unit
372 Cooling unit
373 Cooling surface
374 Entrainment separator
376 Collecting section
378 Cleaner
379 Liquid pump
380 Cooling circuit
382 Cooling circuit control unit
400 Line
568 Exhaust gas passage
570 Liquid injection system
570A Liquid spray outlet
572 Cooling unit
573 Cooling surface
573A Cooling tube
573B Cooling fin
584 Water droplets
668 Exhaust gas passage
672 Cooling unit
673 Cooling surface
673A Cooling tube
673B Cooling fin

The invention claimed is:

1. An exhaust gas cooler for cooling exhaust gas of an internal combustion engine, the exhaust gas cooler comprising:
a cooler housing having an exhaust gas inlet and an exhaust gas outlet forming an exhaust gas passage extending between the exhaust gas inlet and the exhaust gas outlet;
a cooling unit installed in the exhaust gas passage with a cooling surface for cooling the exhaust gas, the cooling surface comprising an initial cooling region in which exhaust gas is cooled to a temperature above a dew point of an evaporated liquid within the exhaust gas, downstream thereof a condensation starting region where the exhaust gas is cooled to a temperature within the range of a dew point of an evaporated liquid within the exhaust gas; and
a liquid injection system comprising at least one liquid spray outlet installed in the exhaust gas passage upstream of the initial cooling region, and configured such that during operation of the internal combustion engine at least some liquid sprayed from the at least one liquid spray outlet is transported to the initial cooling region; wherein the liquid injection system comprises at least one other liquid spray outlet positioned along the condensation starting region.

2. The exhaust gas cooler of claim 1, wherein at least one of the at least one liquid spray outlet is configured to spray liquid onto the cooling surface.

3. The exhaust gas cooler of claim 1, further comprising a liquid injection control unit configured to adjust the operation of the liquid injection system in a continuous and/or a non-continuous operation mode and/or to adjust the amount of injected liquid by the liquid injection system in dependence of a control parameter selected from the group of parameters comprising the type of fuel, the sulphur content of the fuel, the air-fuel ratio, a time interval, a pressure drop along the exhaust gas cooler, a time interval, the volume flow through the exhaust gas cooler, a pressure upstream of the exhaust gas cooler, and a pressure downstream of the exhaust gas cooler.

4. The exhaust gas cooler of claim 1, wherein the at least one liquid spray outlet is configured to provide the liquid at a temperature and/or droplet size such that the liquid is transported in a liquid phase to the initial cooling region and/or the condensation starting region, and/or
the liquid injection control unit is configured to adjust the flow rate of the liquid and/or temperature of the liquid.

5. The exhaust gas cooler of claim 1, wherein the cooling unit is configured as a finned tube bundle and the cooling surface is formed by a plurality of spaced opposed fins and at least one cooling tube.

6. The exhaust gas cooler of claim 1, further comprising:
an entrainment separator installed in the exhaust gas passage downstream of the cooling unit.

7. The exhaust gas cooler of claim 1, wherein the dew point is the dew point of water and/or sulphuric acid being evaporated in the exhaust gas.

8. A closed loop exhaust gas cooling system comprising:
an exhaust gas cooler according to claim 1;
at least one liquid collecting section positioned in a mounted orientation below the liquid injection system, the cooling unit, and/or the entrainment separator; and a cleaner fluidly interconnected between the at least one collecting section and the liquid injection system.

9. The closed loop exhaust gas cooling system of claim 8 further comprising:
a cooling circuit for providing coolant to the cooling unit; and
a cooling circuit control unit,
wherein the cooling circuit control unit is configured to set a coolant temperature and/or a coolant flow rate such that exhaust gas passing the cooling unit is cooled to at least 140° C., 100° C., 80° C., 50° C., 45° C., 40° C., or 35° C., and/or wherein the cooling circuit control unit is configured to set the coolant temperature and/or the coolant flow rate such that exhaust gas passing the cooling unit is cooled to a temperature within the range of or below the dew point of an evaporated liquid within the exhaust gas such as sulphuric acid and/or water.

10. An internal combustion engine comprising:

a combustion unit with one or more cylinders and associated combustion chambers; and an exhaust gas recirculation system with an exhaust gas cooler according to claim 1 and a closed loop exhaust gas cooling system including at least one liquid collecting section positioned in a mounted orientation below the liquid injection system, the cooling unit, and/or the entrainment separator; and a cleaner fluidly interconnected between the at least one collecting section and the liquid injection system.

11. The exhaust gas cooler of claim 1 wherein in the initial cooling region substantially no evaporated liquid condenses.

12. The exhaust gas cooler of claim 1 wherein the evaporated liquid condenses on the cooling surface of the condensation starting region.

13. The exhaust gas cooler of claim 1 wherein in an end cooling region the exhaust gas is cooled to a temperature below the dew point of water thereby condensing water in the end cooling region.

14. A method for reducing clogging of a cooling unit of an exhaust gas cooler, the cooling unit having a cooling surface, the method comprising:

while cooling exhaust gas of an exhaust gas stream within the range of a dew point of an evaporated liquid within the exhaust gas such as sulphuric acid and/or water via the cooling surface;

providing liquid into the exhaust gas stream, such that the cooling surface is maintained clean and/or cleaned by interaction of the liquid with the cooling surface;

wherein liquid is sprayed in a liquid phase onto a condensation starting region of the cooling surface of the cooling unit.

15. The method of claim 14, further comprising collecting the provided liquid with particulate matter;

cleaning the liquid; and returning the cleaned liquid for being provided into the exhaust gas stream.

* * * * *